Patented Dec. 18, 1951

2,578,738

UNITED STATES PATENT OFFICE 2,578,738

BIOLOGICAL PRODUCTION OF RIBOFLAVIN

Thomas G. Pridham, Peoria, Ill., assignor to the United States of America as represented by the Secretary of Agriculture No Drawing. Application November 4, 1949,
Serial No. 125,641

2 Claims. (Cl. 195—35)

(Granted under the act of March 3, 1883, as
amended April 30, 1928; 370 O. G. 757)

This application is made under the act of March 3, 1883, as amended by the act of April 30, 1928, and the invention herein described, if patented in any country, may be manufactured and used by or for the Government of the United States of America for governmental purposes throughout the world without the payment to me of any royalty thereon.

This invention relates to an improvement in the production of riboflavin (vitamin $B_2$) by treatment of nutrient mediums being fermented by the yeast-like organism *Ashbya gossypii*.

In U. S. Patent 2,445,128, Tanner et al disclose the production of riboflavin by cultivating *Ashbya gossypii* under submerged aerobic conditions in a medium containing a fermentable carbohydrate and a proteinaceous material. According to the process of said patent and other prior processes this organism produces riboflavin in yields of 600–700 μg. per ml. of culture liquor in laboratory shaker flasks and larger scale fermentations. Yields as high as 1,000 μg. per ml. are occasionally obtained. The real potentialities of the organism are indicated, nevertheless by extremely rare instances of fermentations showing yields in excess of 1400 μg. per ml. Heretofore, these isolated high-yelding fermentations have not been reproducible.

In accordance with this invention yields of the order of 1400 μg. per ml. and considerably above may be obtained with surprising consistency. The yields usually range several hundred μg. per ml. in excess of those ordinarily obtainable from normal fermentations conducted by the customary prior processes. Moreover, the course of abnormally low-yelding fermentations, as are occasionally encountered in prior processes, may be altered by the process of this invention such that moderately high yields are obtained.

In general, my process is similar to that described in the Tanner et al. patent, previously referred to. A nutrient medium is prepared in accordance with the patent disclosure. The medium contains fermentable sugar and assimilable nitrogen, preferably in the form of partially degraded plant and/or animal proteins and mineral salts. The necessary vitamins and growth factors are naturally present in the partially degraded proteinaceous material. I prefer to employ as proteinaceous material a combination of partially degraded plant protein and partially degraded animal protein.

Materials such as corn steep liquor, peptone, yeast and yeast products, distillers' byproducts, liver residues, animal tankage and other plant and animal proteinaceous substances contain factors essential for riboflavin synthesis by *Ashbya gossypii*. Moreover, I may employ animal stick liquor as the source of assimilable nitrogen, as disclosed by Tanner in application Ser. No. 26,233, filed May 10, 1948 now abandoned and published as an abstract. The initial level of proteinaceous material should lie within the range of about 0.25 to 5.0 percent of the medium.

Initial carbohydrate levels of from 0.5 to 10 percent of the medium may be used satisfactorily, but levels of from 1 to 4 percent are preferred. Fermentable sugars other than glucose may be used, such as sucrose and maltose.

The medium is sterilized and inoculated with an active culture of *Ashbya gossypii*. During the course of incubation, the culture is either aerated, or agitated in the presence of air, or both aerated and agitated. Aeration is preferably carried out by the direct introduction of sterile air into the fermentation vessel.

I have discovered that the yeld of riboflavin may usually be increased by adding an increment of fermentable sugar during the course of the fermentation. However, the mere addition of supplementary fermentable sugar gives ostensibly erratic results, for some fermentations in which an increment is added show a substantially complete suppression of riboflavin production, whereas control experiments under identical conditions but with no added sugar give high yields. In general, however, the effect of "feeding" is to increase the ultimate yield.

In my further researches I have made the further discovery that there is a critical time during the fermentation, at which, if a supplementary amount of fermentable sugar is added, the yield of riboflavin is increased by 200 to 500 μg. per ml.

This critical time usually lies within the period of 48 to 72 hours after the start of the fermentation, but may occasionally lie without that range of time, either sooner or later. It is characterized first by the hydrogen ion concentration of the fermenting culture. In general, the pH first falls to about 4.5 during the initial stages and then rises gradually to about 7.5–8.0 in the final stage. The beginning of the critical period for adding the supplementary amount of fermentable sugar is when the pH of the medium reaches approximately 5.3 and the end of the period occurs when the pH has risen to about 6.4. At this stage during the fermentat ion two other characteristics of the culture are evident. Within the period appreciable amounts of riboflavin can be isolated from the medium, indicating that the biological synthesis is in press. Also, within the period the content of reducing substances, calculated as glucose lies within the range of 0.10 to 0.20 percent. In accordance with my observations these three phenomena occur concurrently.

According to the process of my invention, I add, within this critical period, a supplementary amount of fermentable sugar. The amount may vary over a wide range, for example, from 0.45 percent to 5.0 percent of the culture medium, but preferably lies within the range of 0.9 to 2.0 percent. For reasons of convenience, I prefer to add the supplementary sugar as a relatively concentrated aqueous solution, although the specific manner of addition does not affect the beneficial results.

The following examples illustrate my invention.

A medium consisting of commercial glucose 4.0 percent, peptone 0.5 percent, and corn steep liquor 2.5 percent (containing about 50 percent solids) was prepared, adjusted to pH 6.6–6.8 with potassium hydroxide and dispensed in 100 ml. amounts into 500 ml. Erlenmeyer flasks. All flasks of media were sterilized with steam at 15 pounds per square inch gauge pressure for 20 minutes after which they were cooled and inoculated with active cultures of Ashbya gossypii NRRL Y–1056. The flasks were then incubated at 27° to 30° C. for 9 days during which time they were continuously agitated in a mechanical shaker. At the times indicated in Table I the cultures were fed measured quantities of a sterile aqueous 25 percent solution of commercial glucose and allowed to ferment further. For each experiment recorded in the table a control fermentation was run under identical conditions, except that no additional sugar was fed.

TABLE I
Effect of feeding added glucose to fermenting cultures of Ashbya gossypii

| Example No. | Control high yield, μg./ml. | pH of culture when fed | $B_2$ content when fed, μg./ml. | Sugar content when fed, per cent | Amount of commercial glucose [1] fed, grams | Hrs. of incubation before feeding | High yield obtained by feeding, μg./ml. | Increased yield due to feeding, μg./ml. |
|---|---|---|---|---|---|---|---|---|
| 1 | 1,024 | | | | 4 | 24 | 864 | |
| 2 | | | | | 2 | 24 | 5 | |
| 3 | | | | | 1 | 24 | 7 | |
| 4 | | | | | 4 | 48 | 816 | |
| 5 | | | | | 2 | 48 | 1,424 | 400 |
| 6 | | | | | 1 | 48 | 1,440 | 416 |
| 7 | 1,264 | 5.50 | 192 | 0.12 | 1 | 48 | 1,488 | 224 |
| 8 | | 5.47 | 184 | 0.15 | 1 | 48 | 1,440 | 176 |
| 9 | 1,088 | 5.86 | 304 | | 1 | 56 | 1,460 | 372 |
| 10 | | 5.78 | 232 | | 1 | 56 | 1,184 | 96 |
| 11 | | 6.20 | | | 1 | 72 | 704 | 96 |
| 12 | 608 | 6.20 | | | 1 | 72 | 784 | 176 |
| 13 | | 6.28 | | | 2 | 72 | 608 | |
| 14 | | 6.16 | | | 2 | 72 | 656 | 48 |
| 15 | 1,280 | 5.62 | 280 | 0.13 | 1 | 48 | 1,760 | 480 |
| 16 | | 5.68 | 296 | 0.13 | 1 | 48 | 1,424 | 144 |
| 17 | | 5.64 | 288 | 0.13 | 2 | 48 | 1,344 | 64 |
| 18 | 1,280 | 5.30 | 192 | 0.11 | 1 | 48 | 1,632 | 352 |
| 19 | | 5.45 | 232 | 0.11 | 1 | 48 | 1,760 | 480 |

[1] Contains 10 percent water of hydration.

As previously stated, my invention is beneficial in altering the course of a non-productive fermentation in such a way that the fermentation is converted thereby to a successful, high-yielding, fermentation. It is widely recognized that for unknown reasons an abnormal riboflavin fermentation will be encountered which ordinarily would yield little or no riboflavin. In my researches I have encountered these fermentations upon occasion and have made the further discovery that these fermentations, if fed the additional amount of fermentable sugar according to my invention, riboflavin synthesis will commence and continue to give ultimately a moderately high yield. Examples of such abnormal fermentations are illustrated in Table II, wherein the fermentations were initiated in accordance with the procedure of the above examples.

In these abnormal fermentations, the time of feeding has been found to define the critical conditions, i. e., within 24–72 hours. This is true because of the abnormal hydrogen ion concentrations which are encountered and the absence of any appreciable amount of riboflavin.

TABLE II
Effect of feeding added glucose to "abnormal" fermentation of Ashbya gossypii

| Example No. | Control high yield, μg./ml. | pH of culture when fed | $B_2$ content when fed, μg./ml. | Sugar content when fed, per cent | Amount of commercial glucose [1] fed, grams | Hrs. of incubation before feeding | High yield obtained by feeding, μg./ml. | Increased yield due to feeding, μg./ml. |
|---|---|---|---|---|---|---|---|---|
| 20 | | | | | 2 | 24 | 2.04 | |
| 21 | | | | | 2 | 24 | 1.92 | |
| 22 | | | | | 2 | 48 | 272 | 269.24 |
| 23 | | | | | 2 | 48 | 352 | 349.24 |
| 24 | | | | | 2 | 72 | 160 | 157.24 |
| 25 | 2.76 | | | | 2 | 72 | 152 | 149.24 |
| 26 | | | | | 1 | 24 | 2.12 | 2.12 |
| 27 | | | | | 1 | 24 | 2.12 | |
| 28 | | | | | 1 | 48 | 400 | 397.24 |
| 29 | | | | | 1 | 48 | 432 | 429.24 |
| 30 | | | | | 1 | 72 | 152 | 149.24 |
| 31 | | | | | 1 | 72 | 164 | 161.24 |
| 32 | | 5.20 | | | 2 | 48 | 5.20 | |
| 33 | 5.20 | 4.85 | | | 1 | 48 | 296 | 290.80 |
| 34 | | 4.70 | | | 2 | 72 | 208 | 202.80 |
| 35 | | 4.70 | | | 1 | 72 | 204 | 198.80 |
| 36 | | 4.90 | | | 2 | 48 | 200 | 188.60 |
| 37 | 11.40 | 4.90 | | | 1 | 48 | 232 | 220.60 |
| 38 | | 4.75 | | | 2 | 72 | 192 | 180.60 |
| 39 | | 4.78 | | | 1 | 72 | 186 | 174.60 |

[1] Contains 10 percent water of hydration.

Other flavinogenic strains of *Ashbya gossypii* may be substituted in the above examples to produce comparable increase of riboflavin yields. Moreover comparable increases in yields have been obtained in larger-scale pilot plant fermentations in accordance with my invention.

I claim:

1. In a process for the biological synthesis of riboflavin in which *Ashbya gossypii* is cultivated in a nutrient medium initially containing 0.5 to 10 percent fermentable sugar, 0.25 to 5.0 percent partially degraded protein and essential nutrient salts, wherein during the cultivation the pH of the medium first falls to about 4.5 and then gradually rises about to 7.5–8.0, biological synthesis of riboflavin taking place during the period the pH is rising about from 5.3 to 6.4 and during which period the content of reducing substances present in the medium, calculated as glucose, lies within the range of 0.10 to 0.20 percent, adding a supplementary amount of fermentable sugar to the medium within the period when the pH is rising through the said range of 5.3 to 6.4.

2. A process according to claim 1 in which the amount of supplementary sugar added is from 0.45 to 5.0 percent.

THOMAS G. PRIDHAM.

REFERENCES CITED

The following references are of record in the file of this patent:

UNITED STATES PATENTS

| Number | Name | Date |
| --- | --- | --- |
| 2,445,128 | Tanner | July 13, 1948 |

FOREIGN PATENTS

| Number | Country | Date |
| --- | --- | --- |
| 593,953 | Great Britain | of 1943 |